US006296256B1

(12) United States Patent
Endo et al.

(10) Patent No.: US 6,296,256 B1
(45) Date of Patent: Oct. 2, 2001

(54) AIRTIGHT ADAPTER AND A REPLACEMENT METHOD THEREFOR

(75) Inventors: Kazunobu Endo, Utsunomiya; Tomoaki Toriya, Yotsukaido; Tsutomu Kurita, Hitachinaka; Yoshiyuki Kato, Naka-gun, all of (JP)

(73) Assignee: Japan Nuclear Cycle Development Institute, Ibaraki-ken (JP)

( * ) Notice: Subject to any disclaimer, the term of this patent is extended or adjusted under 35 U.S.C. 154(b) by 0 days.

(21) Appl. No.: 09/247,512

(22) Filed: Feb. 10, 1999

(30) Foreign Application Priority Data

Feb. 10, 1998 (JP) ................................................ 10-044343

(51) Int. Cl.[7] ........................................................ F16L 5/00
(52) U.S. Cl. ............................................ 277/606; 277/910
(58) Field of Search .................................... 277/511, 602, 277/606 I, 625, 910; 285/139.2, 142.1, 192, 201, 206

(56) References Cited

U.S. PATENT DOCUMENTS 5,238,252 * 8/1993 Stewen et al. ....................... 277/511

FOREIGN PATENT DOCUMENTS 144 683 10/1980 (DE) .
30 30 030 3/1982 (DE) .
30 42 613 6/1982 (DE) .
195 31 296 12/1996 (DE) .
0 418 160 3/1991 (EP) .
0 742 562 11/1996 (EP) .
2 044 160 10/1980 (GB) .

* cited by examiner

*Primary Examiner*—Robert J. Sandy
*Assistant Examiner*—Karlena D. Schwing
(74) *Attorney, Agent, or Firm*—Wenderoth, Lind & Ponack L.L.P.

(57) ABSTRACT

An airtight adapter to be mounted to an airtight unit requiring airtightness, e.g. a glove box, with which it is possible to easily replace a part of the airtight adapter while maintaining airtightness. The adapter has an outer-cylinder adapter body, an internal adapter body inserted into and fitted in the outer-cylinder adapter body and at least two annular sealing members positioned between the internal adapter body and the outer-cylinder adapter body. By determining a length of the outer-cylinder adapter body and positions of the sealing members, the internal adapter body can be easily, airtightly replaced by bringing a spare internal adapter body into contact with the already-fitted internal adapter body at the outside of the airtight unit; pushing and inserting the spare internal adapter body into the cylinder of the outer-cylinder adapter body while moving the already-fitted internal adapter body toward the inside of the airtight unit; securing the spare internal adapter body at a predetermined position in the cylinder of the outer-cylinder adapter body.

15 Claims, 9 Drawing Sheets

AIRTIGHT ADAPTER AND A REPLACEMENT METHOD THEREFOR

BACKGROUND OF THE INVENTION

The present invention relates to an airtight adapter to be set to airtight units (including a vessel, equipment, or structure) and its replacing method.

As the airtight unit requiring airtightness, there are a device for handling, for example, nuclear fuel substance, radiation substance, toxic substance, chemicals causing a violent reaction, or specific bacteria or cell and a device for isolating water or a vacuum portion.

Particularly, to perform various tests or gene manipulations by bringing a nuclear fuel substance or radiation substance, toxic substance, chemicals causing a violent reaction, or specific bacteria or cell into the airtight units, it is necessary to strictly prevent the substance, bacteria, or cell from leaking or splashing to the outside.

As an airtight unit meeting the above requirements, a glove box, for example, is well known. FIG. 8 shows an example of the glove box.

In the case of the glove box 1, an operator observes the inside through an inspection window while bringing a test object such as a nuclear fuel substance or radiation substance inside and illuminating the object with previously-equipped various illumination means 2, 3 and 4, and performs predetermined tests by putting his hand into a retractable glove which is kept in an airtight state from the inside or by operating various testing equipments 5 with a robot hand.

The illumination means 2 uses, for example, a conventional fluorescent lamp. In this case, electric power is supplied to the means 2 from an external power supply 6 through an external cable 9*a* (electrical wire), an airtight adapter 40 disposed in the wall surface la of the glove box 1, and an internal cable 9*b*. Electric power is also supplied to the internal testing equipments 5 in the same manner. Moreover, control signals and data are transferred between the testing equipments 5 and an external unit 7 through an external cable 10*a* such as a signal line or optical cable and an internal cable 10*b* also provided through the airtight adapter 40.

Moreover, the illumination means 3 and 4 are used to directly take illumination light into the glove box 1 from an external light source 8 through a light guide (light transmission means) 11*a*. The illumination means 3 directly illuminates an object from the bottom end of the airtight adapter 40 disposed in the wall surface la of the glove box 1, while the illumination means 4 concentrically illuminates the hand of an operator by further connecting a light guide 11*b* constituted with a fiber bundle which can be freely moved to the bottom end of the airtight adapter 40.

The glove box 1 uses an airtight adapter 40 shown below. For example, the airtight adapter 40A shown in FIG. 9 is constituted by directly fixing a cylindrical adapter body portion 12 to the wall surface 1*a* of the glove box 1 through welding or the like, putting a glass rod (a transparent resin rod may be also used) 15*a* in the cylinder as light transmission means and also setting annular grooves 13 and 13 to two places at the inner surface of the cylinder, putting O-rings 14 and 14 in the grooves to keep airtightness, and connecting light guides 11*a* and 11*b* to the both ends of the glass rod 15*a*. In the case of the illumination means 3 of directly illuminating an object from the bottom end of the airtight adapter 40A, it is necessary to merely extend the glass rod 15*a* slightly into the glove box 1.

Moreover, another type of airtight adapter keeps airtightness by directly fixing the cylindrical adapter body portion 12 to the wall surface la of the glove box 1 through welding or the like, passing a cable such as a power supply line or signal line through the cylinder instead of the glass rod serving as the light transmission means in FIG. 9, and filling the cylinder with a filler such as a resin.

Still another type of airtight adapter is constituted with a cylindrical adapter body having a collar-shaped flange, and fixed to the wall surface 1*a* of the glove box 1 by a fixture such as a screw through the flange and moreover, a connection port connecting with the light guides 11*a* and 11*b* is formed on the inside of the both ends of the cylinder. Furthermore, the glass rod 15*a* contacting with the ends of the light guides 11*a* and 11*b* is inserted into the cylinder in an airtight manner through two O-rings 14 and 14 set to two annular grooves formed at the inner surface of the cylinder. Furthermore, an O-ring for sealing is positioned between the wall surface 1*a* and the flange.

Still another type of airtight adapter is constituted with a cylindrical adapter body having a collar-shaped flange, and fixed to the wall surface 1*a* of the glove box 1 by a fixture such as a screw through the flange and moreover, a cable such as a power supply line or signal line is passed through the inside of the both ends of the cylinder, and the cylinder is filled with a filler such as a resin to keep airtightness.

Furthermore, even in the case of an inspection window formed when the glove box 1 is made of an opaque material such as a metal, the inspection window is constituted with a type of airtight adapter structure. In this case, a sealing member such as a packing is fitted to the margin of a transparent body serving as a window glass, the member is brought into contact with the wall surface la of the glove box 1 together with a pressing frame and fitted to the opening of an inspection window portion of the glove box wall surface and the pressing frame is fixed by a fixture such as a screw.

However, the above airtight adapters have a problem that the initial light transmission characteristic cannot be obtained if an end face of the glass rod 15*a* is scratched when the light guides 11*a* and 11*b* are set or chemicals or chemical products are attached to the internal end face due to a chemical reaction in a glove box or splash of chemicals or chemical products under operation, because replacement of these adapters are not originally intended. Moreover, there is a problem that a filler through which a cable is passed or the cable itself is deteriorated as time passes due to a chemical reaction or splash of chemicals or chemical products in a glove box.

Particularly when cables are used, it is necessary to increase the number of cables or number of cable cores and correspond to the increase of cables or cable cores. Moreover, a transparent inspection window has a problem that it is contaminated or damaged as time passes.

In this case, because the above conventional airtight adapters are fixed-type and replacement of them is not intended as described above, it is impossible to correspond to the problems, the glove box itself may be disused, and therefore, the adapters are wasteful.

SUMMARY OF THE INVENTION

The present invention is made to solve the above-described problems and its object is to provide an airtight adapter that can be replaced by a relatively simple operation and its replacing method for an airtight unit requiring airtightness like a glove box.

According to the present invention, there is provided an airtight adapter to be set to an airtight unit requiring airtightness, comprising: an outer-cylinder adapter body fixed to an airtight boundary of the airtight unit in an airtight manner; an internal adapter body inserted into and fitted in the cylinder of the outer-cylinder adapter in an airtight replaceable manner; and an annular sealing member positioned between the outer periphery of the internal adapter body and the inner periphery of the outer-cylinder adapter body.

In a preferred embodiment of the present invention, the airtight adapter is provided with at least two annular sealing members comprising an inside sealing member and an outside sealing member; the internal adapter body extends from the outside to the inside of the airtight unit; and a relation of a>b+c is accomplished assuming the length of the outer-cylinder adapter body as "a", the clearance from the outside sealing member up to the outside end of the internal adapter body as "b", and the clearance from the inside sealing member up to the inside end of the internal adapter body as "c".

In the present invention, there is also provided a method of replacing the airtight adapter of the above-described preferred embodiment, comprising the steps of: bringing an end face of a spare internal adapter body for replacement into contact with one end of the already-fitted internal adapter body at the outside of the airtight unit; pushing and inserting the spare internal adapter body for replacement into the cylinder of the outer-cylinder adapter body while moving the already-fitted internal adapter body toward the inside of the airtight unit; fitting the spare internal adapter body for replacement at a predetermined position in the cylinder of the outer-cylinder adapter body; and removing the already-fitted internal adapter body into the inside of the airtight unit, to thereby completing replacement of the already-fitted internal adapter body in an airtight manner.

In the present invention, it is possible to replace the internal adapter body in the airtight adapter not having the above-described relation of a>b+c. Namely, the replacing method comprises the steps of: setting a cylindrical joint to one end of the already-fitted internal adapter body at the outside of the airtight unit; setting an extended cylinder to one end of the outer-cylinder adapter body at the inside of the airtight unit; inserting one end of a spare internal adapter body for replacement into an open port of the cylindrical joint to thereby integrate the spare internal adapter body for replacement with the already-fitted internal adapter body; pushing and inserting the spare internal adapter body for replacement into the cylinder of the outer-cylinder adapter body while moving the already-fitted internal adapter body into the extended cylinder; fitting the spare internal adapter body for replacement at a predetermined position in the cylinder of the outer-cylinder adapter body; and removing the extended cylinder in which the already-fitted internal adapter body has been inserted and the cylinder joint set to the one end of the spare internal adapter body into the inside of the airtight unit, to thereby completing replacement of the already-fitted internal adapter body in an airtight manner.

PREFERRED EMBODIMENTS OF THE INVENTION

Figure 1:
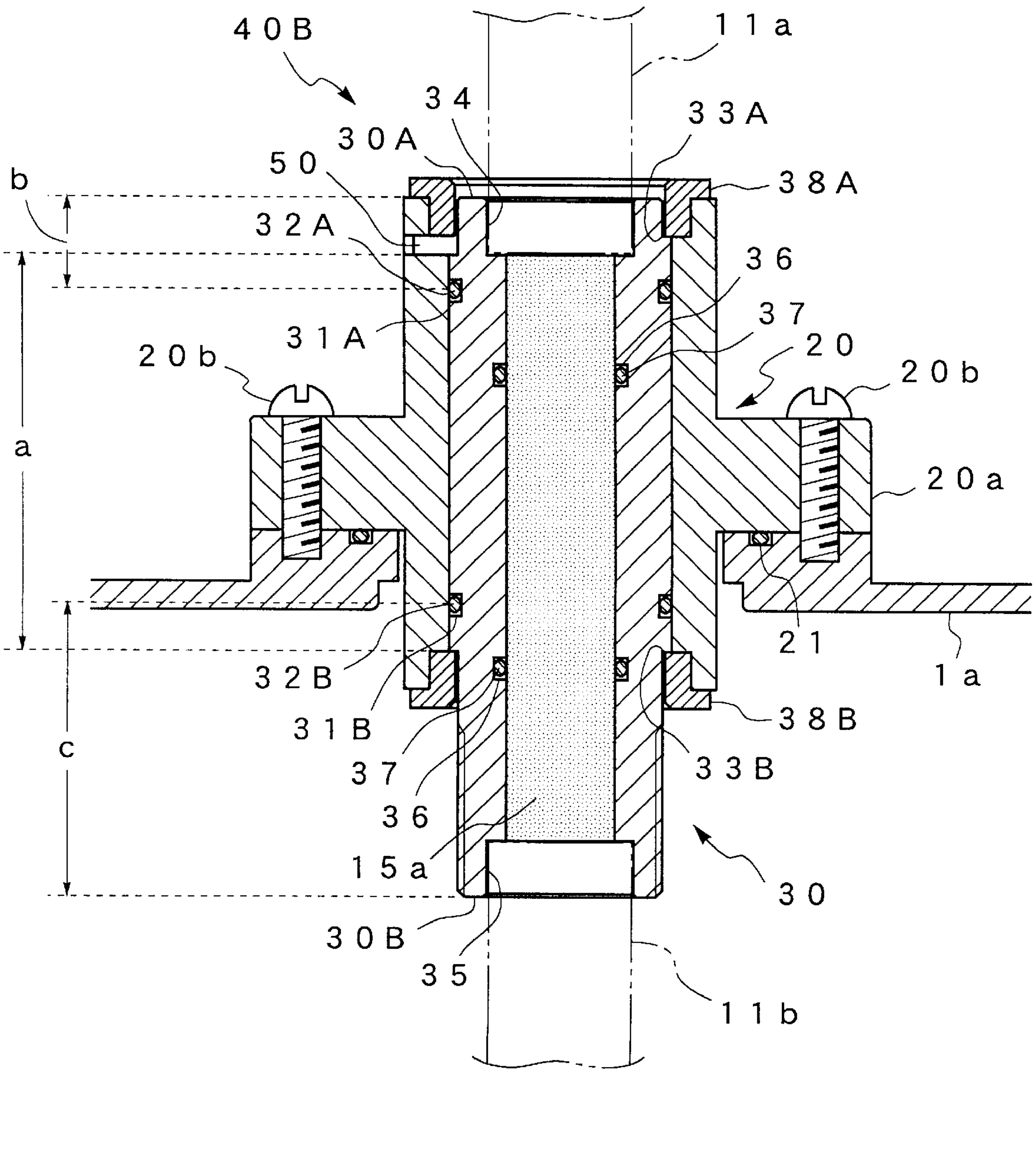
FIG. 1 is a longitudinal sectional view showing an example of an airtight adapter of the present invention.

FIG. 1 shows an example of the airtight adapter of the present invention. Like components are designated by like reference numerals throughout FIGS. 1 to 7.

In the airtight adapter 40B, the main portion is constituted with an outer-cylinder adapter body 20 having a collar-shaped flange 20*a* and a cylindrical internal adapter body 30, and the internal adapter body 30 can be replaced according to necessity.

Figure 8:
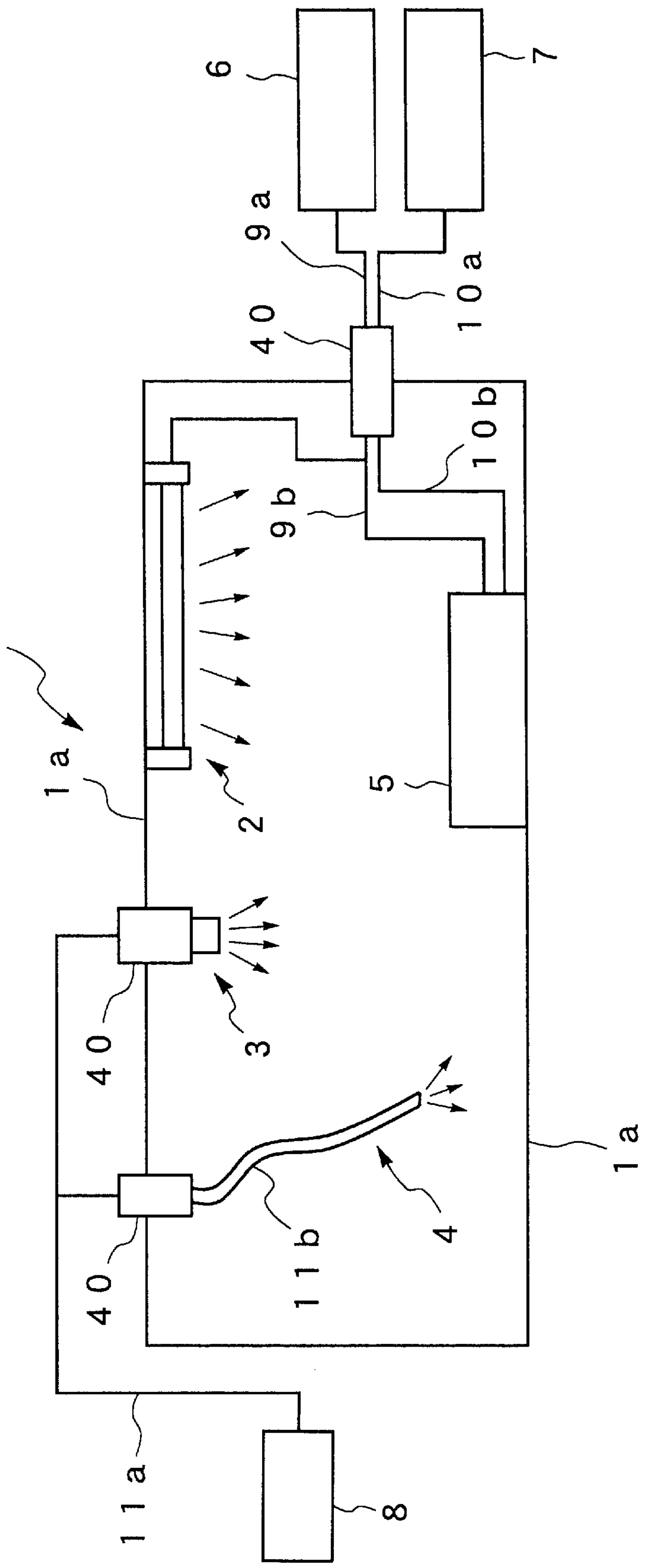
FIG. 8 is a schematic illustration showing the operating state of a glove box serving as an airtight unit.
Figure 9:
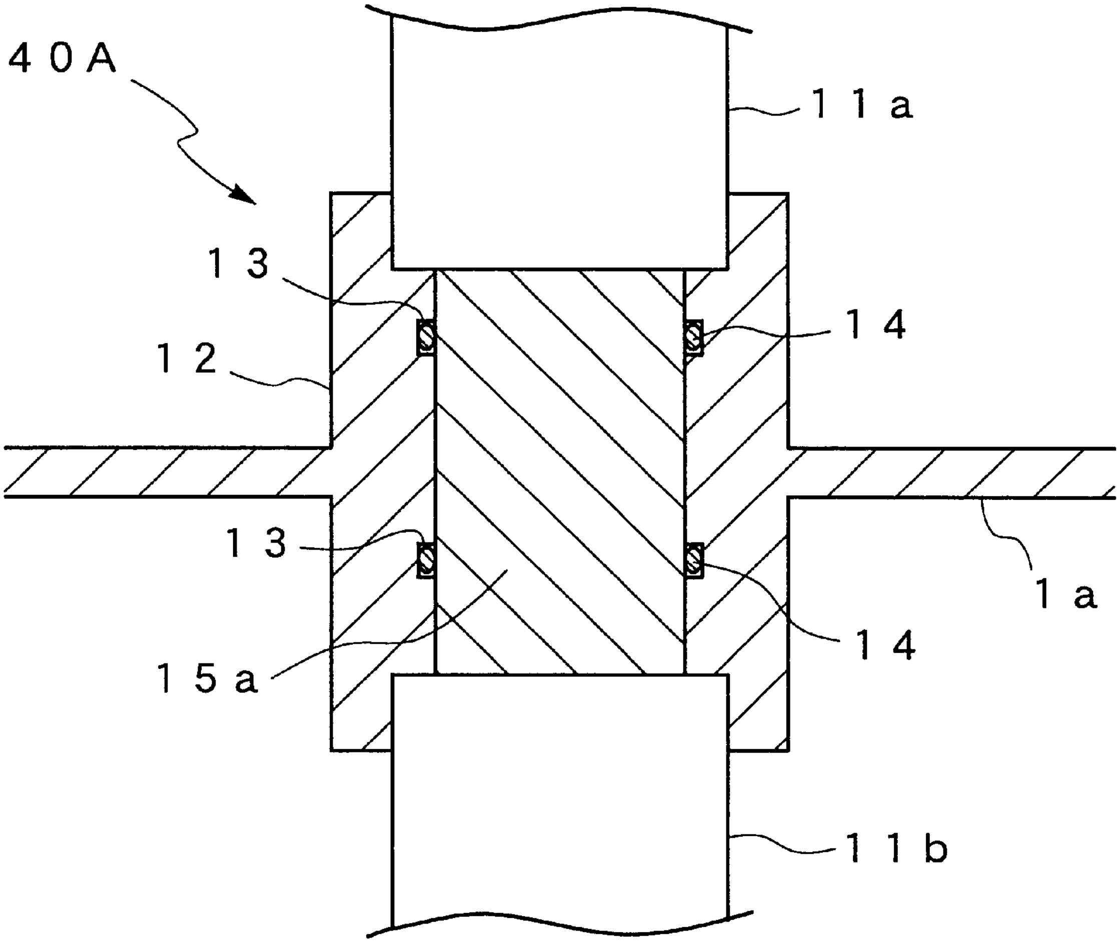
FIG. 9 is a longitudinal sectional view showing an example of a conventional airtight adapter.

The outer-cylinder adapter body 20 has the collar-shaped flange 20*a* on almost central outer periphery of the relatively long cylinder and is fixed to an airtight boundary, such as a wall surface 1*a* of a glove box same as that shown in FIG. 8 by fixtures 20*b* and 20*b* such as screws. The body 20 may be also fixed through welding, and an O-ring 21 for sealing is set between the wall surface 1*a* and the flange 20*a*.

The internal adapter body 30 is inserted into the cylinder of the outer-cylinder adapter body 20 through at least two (or three or more) O-rings 32A and 32B serving as annular sealing members set in at least two (or three or more) annular grooves 31A and 31B formed at a great deal of relatively separated places on the outer periphery of the body 30. Stepped portions 33A and 33B are formed at an end (top end in FIG. 1) of the outer periphery and the middle of the outer periphery (middle portion close to bottom end in FIG. 1) of the internal adapter body 30, respectively. Annular fixing ring members 38A and 38B screwed into the both ends of the cylinder of the outer-cylinder adapter body 20 contact the stepped portions 33A and 33B from the both sides, so as to hold the internal adapter body 30 to the outer-cylinder adapter body 20. Moreover, a key member 50 serving as a key pin for controlling the rotation of the internal adapter body 30 is removably set to a part of the internal adapter body 30 and a part of the outer-cylinder adapter body 20 at the internal end face of the outside fixing ring member 38A (top end side in FIG. 1).

Connection ports 34 and 35 connecting with light guides 11*a* and 11*b* are formed on the inside of the both ends of the cylinder of the internal adapter body 30, and a glass rod (light transmission body) 15*a* contacting with the ends of the light guides 11*a* and 11*b* is inserted into the internal adapter body 30 in an airtight manner through two O-rings 37 and 37 set in annular grooves 36 and 36 formed at two portions in the inner periphery of the internal adapter body 30 and fixed by an adhesive or the like.

Therefore, matters (nuclear fuel substance, radiation, and chemically produced gas) in the glove box do not leak to the outside through the airtight adapter 40B.

In order to correspond to simple and quick replacement of the internal adapter body 30, the airtight adapter 40B is constituted so that a relation of a>b+c is obtained by assuming the length of the outer-cylinder adapter body 20, more accurately, the length between the inside stepped portion 33B and the inserting hole of the key member 50 as “a”, the clearance from the outside O-ring 32A (upper one in FIG. 1) of the internal adapter body 30 up to the outside end 30A (upper end in FIG. 1) of the internal adapter body 30 as “b”, and the clearance from the inside O-ring 32B (lower one in FIG. 1) up to the inside end 30B (lower end in FIG. 1) of the internal adapter body 30 as “c”.

According to the above-described relation, if an end of the glass rod 15*a* of the airtight adapter 40B is scratched or contaminated, it is possible to quickly replace the internal adapter body 30 through a relatively simple operation while keeping airtightness.

The method of replacing the above-described airtight adapter 40B shown in FIG. 1 is described below.

The outside fixing ring member 38A (top end side in FIG. 1) at the outside of the glove box is first removed and then, the key member 50 at the side of the internal adapter body 30 is removed.

Then, the inside fixing ring member 38B is removed from the inside of the glove box. In this condition, the internal adapter body 30 has some holding power due to the frictional force of the O-rings 32A and 32B but it is basically brought into a free state. Therefore, the body 30 is temporarily supported from either inside or outside.

Thereafter, an end face 30B of a spare internal adapter body 30 for replacement (not shown) is brought into contact with the outside end face 30A of the already-fitted internal adapter body 30 and slowly inserted.

Under the above insertion, even if the inside O-ring 32B of the already-fitted internal adapter body 30 at the glove box side is removed from the cylinder portion of the outer-cylinder adapter body 20, airtightness is kept because the outside O-ring 32A moves while sliding on the inside of the cylinder of the outer- cylinder adapter body 20. Moreover, when the outside O-ring 32A of the already-fitted internal adapter body 30 reaches the position where the O-ring 32A is removed from the cylinder portion of the outer-cylinder adapter body 20, the inside O-ring 32B of the internal adapter body 30 for replacement at the glove box side is newly inserted into the cylinder of the outer-cylinder adapter body 20 and moves while sliding on the inside of the cylinder of the outer-cylinder adapter body 20.

Therefore, even if the already-fitted internal adapter body 30 is completely removed from the outer-cylinder adapter body 20, the airtightness of the airtight adapter 40B is kept.

The airtightness is well maintained in accordance with the relation (a>b+c) between the length “a” of the outer-cylinder adapter body 20, the clearance “b” from the outside O-ring 32A (upper one in FIG. 1) up to the outside end 30A (upper end in FIG. 1) of the internal adapter body 30, and the clearance “c” from the inside O-ring 32B (lower one in FIG. 1) up to the inside end 30B (lower end in FIG. 1) of the internal adapter body 30.

Thus, when the spare internal adapter body 30 for replacement reaches a predetermined position, the inside fixing ring member 38B is set to a predetermined portion of the outer-cylinder adapter body 20 from the inside of the glove box. Thereafter, the key member 50 is set to a predetermined position, and then the outside fixing ring member 38A is set to a predetermined portion of the outer-cylinder adapter body 20.

Thereby, the airtight adapter 40B under the state shown in FIG. 1 is obtained and replacement of the internal adapter body 30 is completed. In this case, only the removed already-fitted internal adapter body 30 is taken into the glove box.

Figure 2:
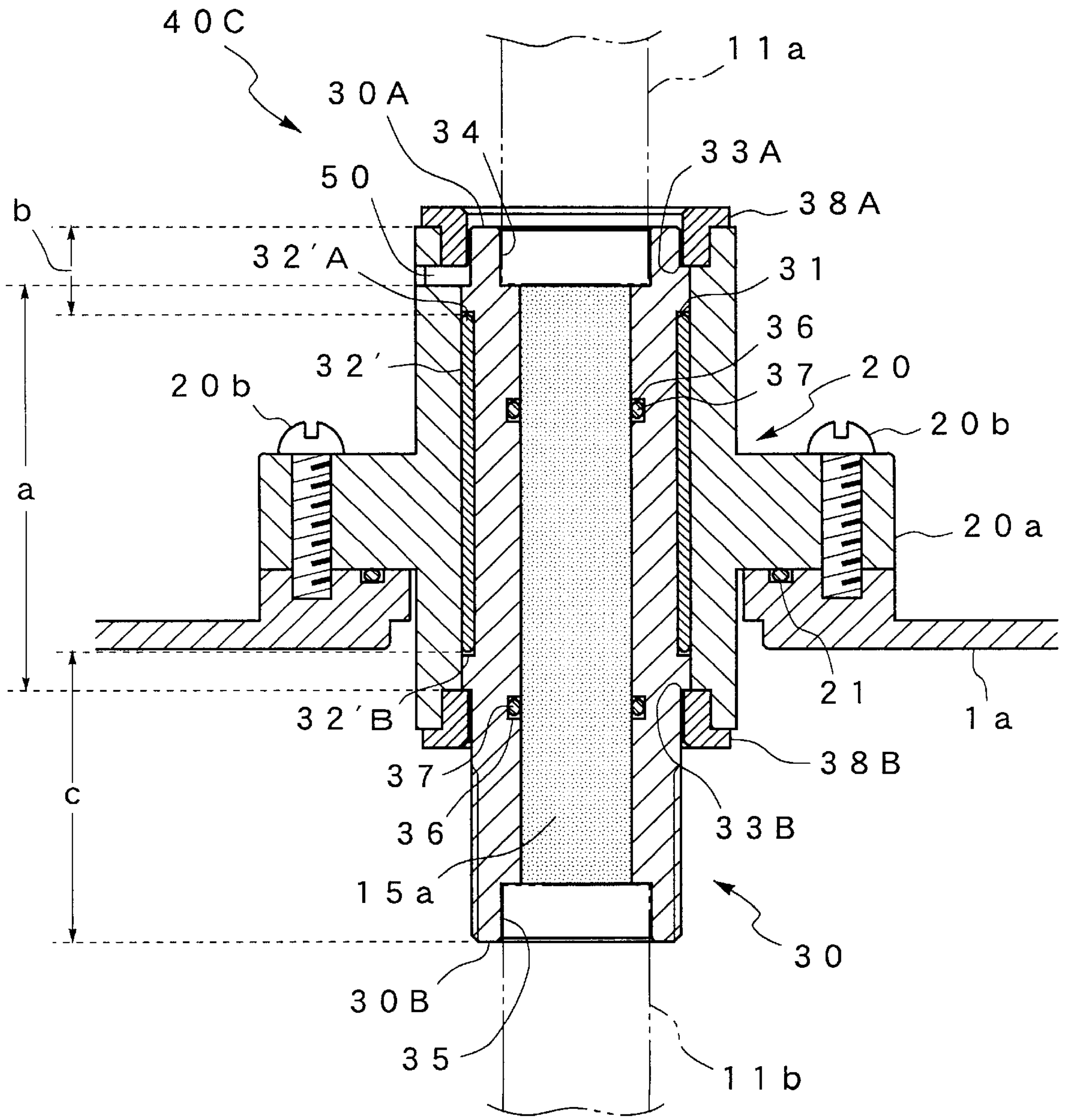
FIG. 2 is a longitudinal sectional view showing another example of an airtight adapter of the present invention.

FIG. 2 shows an example of the sealing member of the airtight adapter different from two sealing members as shown in FIG. 1. The airtight adapter 40C basically has an almost same structure as the airtight adapter 40B in FIG. 1 but it is different from the airtight adapter 40B in sealing member. That is, in this example, an annular sealing member 32' is formed like a tube. Moreover, the example is constituted so that a relation of a>b+c is obtained by assuming the length of the outer-cylinder adapter body 20 as “a”, the clearance from the outside end 32'A (upper end in FIG. 2) of the sealing member 32' up to the outside end 30A (upper end in FIG. 2) of the internal adapter body 30 as “b”, and the clearance from the inside end 32'B (lower end in FIG. 2) of the sealing member 32' up to the inside end 30B (lower end in FIG. 2) of the internal adapter body 30 as “c”.

Therefore, the airtight adapter 40C also has almost same functions and advantages as the airtight adapter 40B as shown in FIG. 1.

Figure 3:
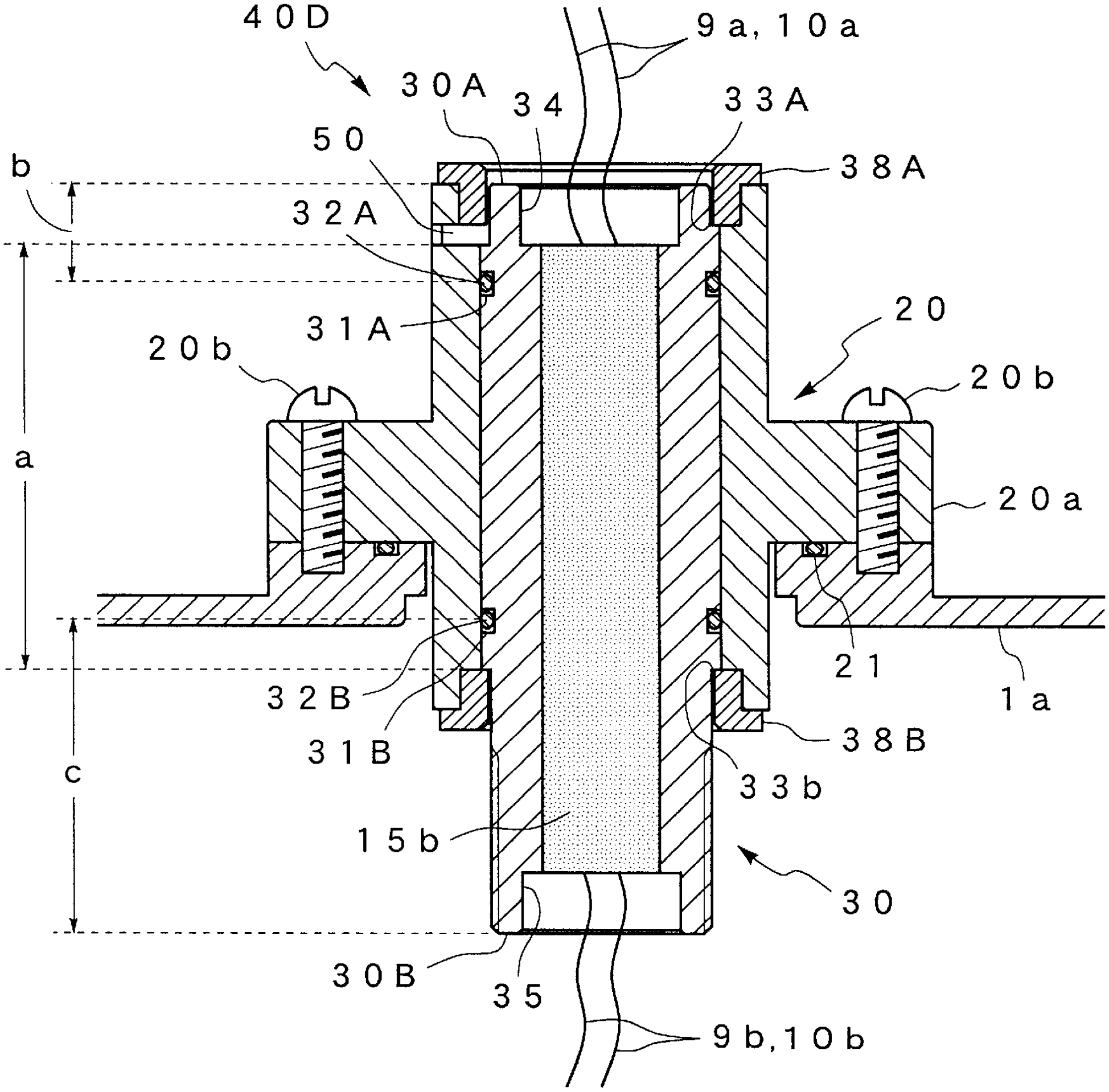
FIG. 3 is a longitudinal sectional view showing another example of an airtight adapter of the present invention.

FIG. 3 shows another example of the airtight adapter of the present invention. The airtight adapter 40D also has almost same structure as the airtight adapter 40B in FIG. 1 but it is slightly different from the airtight adapter 40B in the internal adapter body 30. Cables 9*a*, 10*a* and 9*b*, 10*b* such as power supply lines or signal lines are passed through the cylinder of the internal adapter body 30, and the cylinder is filled with a filler 15*b* such as a resin.

Also in the internal adapter body 30 as shown in FIG. 3, the filler 15*b* and cables are deteriorated due to reaction tests in the glove box as time passes. Moreover, it may be necessary to replace the body 30 because it is necessary to increase the number of cables or the number of cable cores due to change of testing equipments employed.

In this case, the already-fitted internal adapter body 30 can be replaced by cutting the external cables 9*a* and 10*a* of the internal adapter body 30 short, performing predetermined operations similar to the case of the airtight adapter 40B in FIG. 1, bringing an end face of a spare internal adapter body 30 for replacement (not shown) arranged by winding the internal cables 9*b* and 10*b* into contact with the outside end face 30A of the already fitted internal adapter body 30, and slowly inserting it. Thereafter, it is necessary to perform predetermined operations similar to the case of the airtight adapter 40B in FIG. 1.

An annular sealing member is not restricted to the O-rings 32A and 32B as shown in FIG. 3 but it is possible to use a tubular sealing member 32' as shown in FIG. 2.

Figure 4:
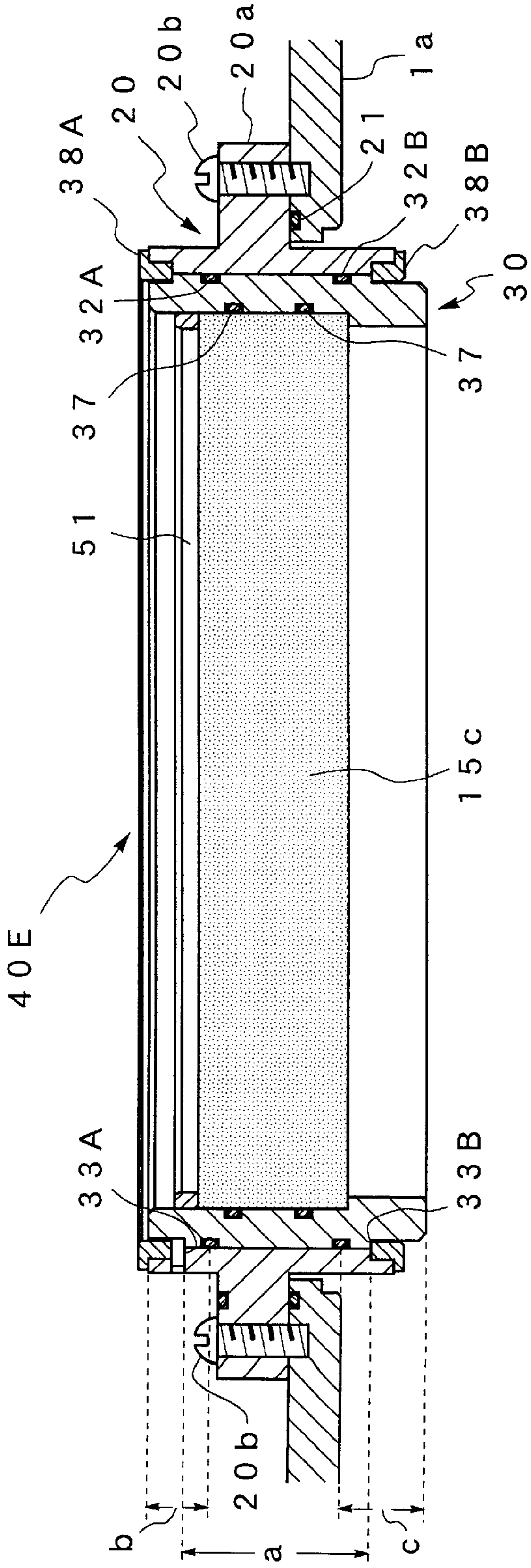
FIG. 4 is a longitudinal sectional view showing still another example of an airtight adapter of the present invention.

FIG. 4 shows still another example of the airtight adapter of the present invention. The airtight adapter 40E also is basically almost the same as the airtight adapter 40B in FIG. 1 but it is different from the adapter 40B in that a transparent body 15*c* such as a glass plate serving as an inspection window of a glove box is set in the cylinder of the internal adapter body 30.

In the airtight adapter 40E, an outer-cylinder adapter body 20 is fixed to the wall surface 1*a* of a glove box by fixtures 20*b* and 20*b* such as screws through a collar-shaped flange 20*a* provided on the almost central outer periphery of the cylinder.

In the internal adapter body 30, O-rings 32A and 32B serving as sealing members are set to a great deal of relatively separated places on the outer periphery of the body 30. The internal adapter body 30 is inserted into the cylinder of the outer-cylinder adapter body 20 through these O-rings 32A and 32B in an airtight manner. Stepped portions 33A and 33B are formed at the outside end (upper end in FIG. 4) and the middle (middle portion close to lower end in FIG. 4) of the outer periphery of the body 30, respectively. Annular fixing ring members 38A and 38B screwed to the inside of the both ends of the outer-cylinder adapter body 20 contact the stepped portions 33A and 33B, so as to hold the internal adapter body 30 to the outer-cylinder adapter body 20.

A disk-like transparent body 15*c* is inserted into the inside of the cylinder of the internal adapter body 30 through two O-rings 37 and 37 in an airtight manner. A reference numeral 51 denotes a stopping member for the transparent body 15*c*.

Since the airtight adapter 40E has almost the same structure as the airtight adapter 40B in FIG. 1, it is also possible to replace the internal adapter body 30 when the inside of the transparent body 15*c* is contaminated or damaged as time passes due to reaction tests in a glove box. The airtight adapter 40E can be applied not only to a glove box, but also to the inspection window of a marine park facility constructed in sea water, a tunnel or an aquarium, or that of a space station. Also in this case, a sealing member is not restricted to the O-rings 32A and 32B but it is possible to use a tubular sealing member as shown in FIG. 2.

Figure 5:
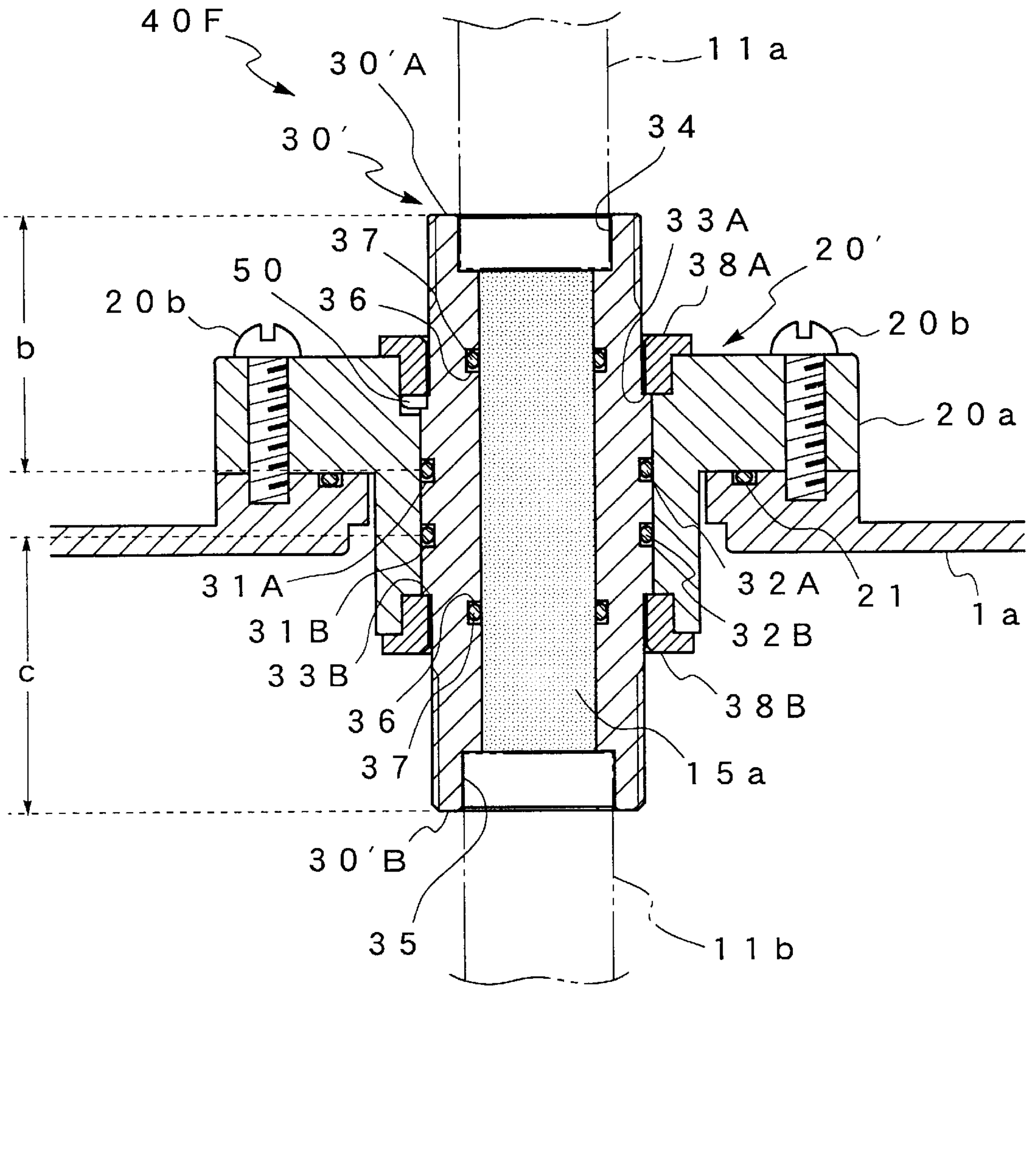
FIG. 5 is a longitudinal sectional view showing still another example of an airtight adapter of the present invention.

FIG. 5 shows an example of the airtight adapter of the present invention. Also in the case of the airtight adapter 40F, the main portion is basically constituted with an outer-cylinder adapter 20' having a collar-shaped flange 20*a* and a cylindrical internal adapter 30', and the internal adapter 30' can be also replaced by using an accessory attachment such as a cylindrical joint 60 or an extended cylinder 70 to be described later by referring to FIG. 6.

The outer-cylinder adapter body 20' is fixed to the wall surface 1*a* of a glove box by fixtures 20*b* and 20*b* such as screws through the flange 20*a*. The body 20' may be also fixed through welding. Moreover, a sealing O-ring 21 is set between the wall surface 1*a* and the flange 20*a*.

In the internal adapter body 30', the central portion of its outer periphery is slightly flared and inserted into the cylinder of the outer-cylinder adapter body 20', in an airtight manner through two O-rings 32A and 32B set in the annular grooves 31A and 31B formed at two places of the flared portion, respectively. Annular fixing ring members 38A and 38B screwed into the inside of the both ends of the cylinder of the outer-cylinder adapter body 20' contact the stepped portions 33A and 33B formed at the both ends of the flared portion of the outer periphery of the body 30', so as to hold the internal adapter body 301 to the outer-cylinder adapter body 20'.

It is possible to use one O-ring 32 or three O-rings 32 or more. Moreover, a key member 50 for controlling the rotation of the internal adapter body 30' is removably set to a part of the internal adapter body 30' and a part of the outer-cylinder adapter body 20' at the internal end face side of the outside fixing ring member 38A.

Connection ports 34 and 35 connecting with light guides 11*a* and 11*b* are formed on the inside of the both ends of the cylinder of the internal adapter body 30'. Furthermore, a glass rod (light transmission body) 15*a* contacting with end faces of the light guides 11*a* and 11*b* are inserted into the cylinder, in an airtight manner through two O-rings 37 and 37 set in the annular grooves 36 and 36 formed at two places in the cylinder and fixed by an adhesive. Therefore, even in the case of the glove box, inside matter (nuclear fuel substance, radiation, or chemically produced gas) does not leak to the outside through the airtight adapter 40F.

In the airtight adapter 40F, the internal adapter body 30' can be replaced through a simple operation when an end face of the glass rod 15*a* is scratched or contaminated.

The method of replacing the airtight adapter 40F shown in FIG. 5 is described below by referring to FIG. 6.

First, the outside fixing ring member 38A (upper end side in FIG. 5) at the outside of the glove box is removed. Then, the cylindrical joint 60 serving as an accessory attachment is screwed into the outside-protruded portion of the internal adapter body 301. In this case, the outside diameter of the cylindrical joint 60 is set to a value allowing the joint 60 to pass through the cylinder of the outer-cylinder adapter body 20'.

After setting the cylindrical joint 60, it is temporarily slightly extracted outward to slide the internal adapter body 30' and remove the key member 50. After removing the key member 50, the internal adapter body 30' is returned to the original position by pushing the cylindrical joint 60.

Under the above state, the inside fixing ring member 38B is removed from the inside of the glove box. In this condition, the internal adapter body 30' is supported by holding the cylindrical joint 60 at the outside of the glove box.

Then, the extended cylinder 70 serving as an accessary attachment and constituted with a pipe member or the like is screwed into the inside of an end of the outer-cylinder adapter body 20' from which the inside fixing ring member 38B has been removed. In this state, it is necessary to hold the internal adapter body 30' so that it does not slip. Moreover, it is necessary to previously bring the extended cylinder 70 into the glove box.

Figure 6:
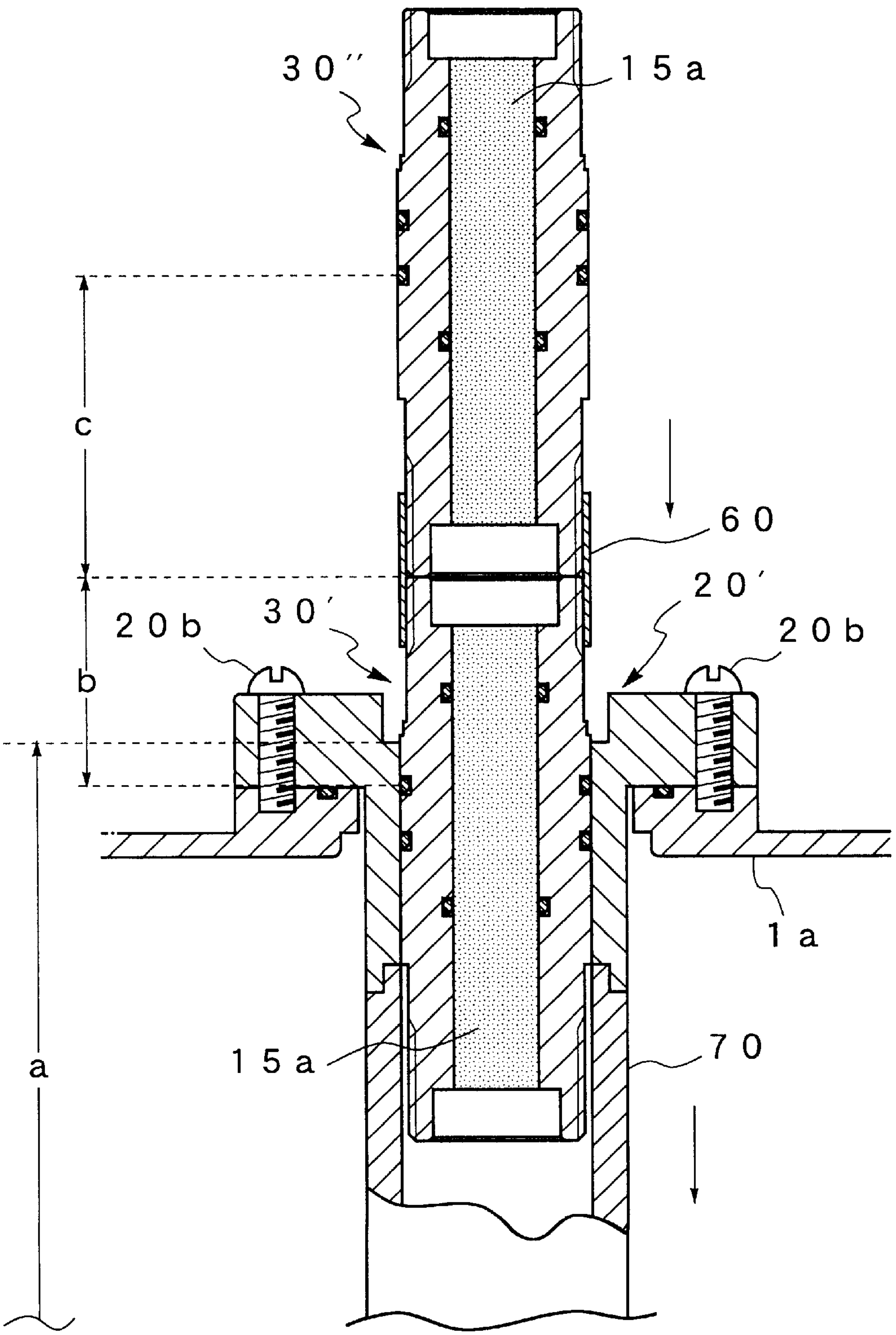
FIG. 6 is a longitudinal sectional view showing the step of bringing a spare internal adapter body for replacement into contact with the already-fitted internal adapter body, and inserting it in the method of replacing the airtight adapter shown in FIG. 5.

In this case, a relation of a>b+c is obtained by assuming the total length of the extended cylinder 70 and the outer-cylinder adapter body 20'(more accurately, the start point at the outer-cylinder adapter body 20' side is assumed as the insertion hole of the key member 50) as "a", the clearance from the outside O-ring 32A (upper one in FIG. 5) of the internal adapter body 30' up to the outside end 30'A (upper end in FIG. 5) of the internal adapter body 30' as "b", and the clearance from the inside O-ring 32B (lower one in FIG. 5) up to the inside end 30'B (lower end in FIG. 5) of the internal adapter body 30' as "c", as shown in FIG. 6.

Under a state in which the extended cylinder 70 is connected, the spare internal adapter body 30' for replacement is screwed into the open port of the cylindrical joint 60, and integrated with the already-fitted internal adapter body 30' to insert them into the glove box as shown by arrows in FIG. 6.

Because the total length "a" of the extended cylinder 70 and the outer-cylinder adapter body 20' meets the relation of a>b+c, the spare internal adapter body 30' for replacement is inserted into the cylinder of the outer-cylinder adapter body 20' while airtightness is kept, and the already-fitted internal adapter body 30' moves toward the extended cylinder 70.

When the spare internal adapter body 30' for replacement reaches a predetermined position of the outer-cylinder adapter body 20', the extended cylinder 70, already-fitted internal adapter body 30', and cylindrical joint 60 are removed and thereafter, the key member 50 is fitted to a predetermined portion and then, the inside fixing ring member 38B is set to a predetermined portion of the outer-cylinder adapter body 20' from the inside of the glove box.

Then, by setting the outside fixing ring member 38A to a predetermined portion of the outer-cylinder adapter 20', the airtight adapter 40F under the state shown in FIG. 5 is obtained and replacement of the internal adapter body 30' is completed. The removed already-fitted internal adapter body 30', the cylindrical joint 60 and the extended cylinder 70 are taken into the glove box.

Figure 7:
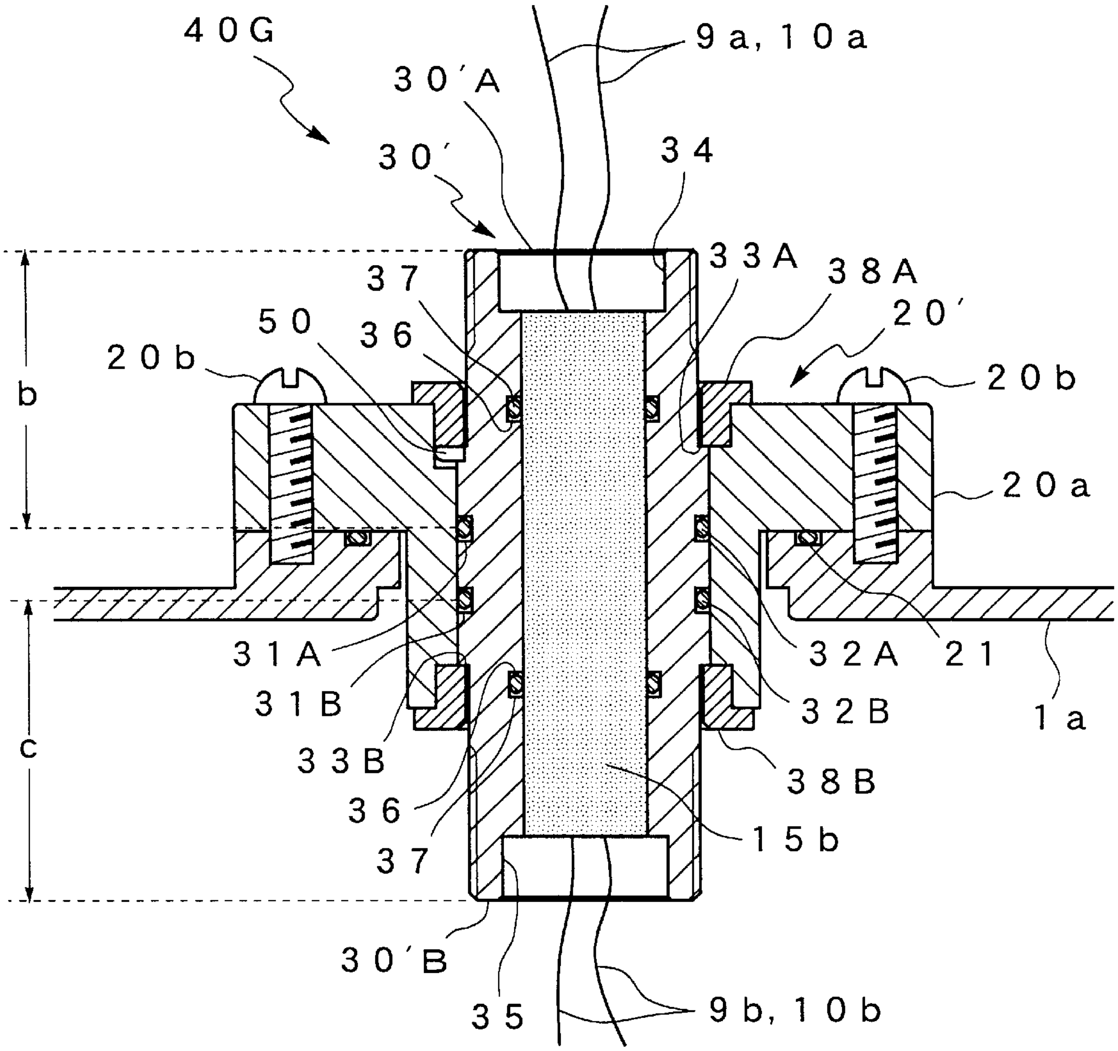
FIG. 7 is a longitudinal sectional view showing still another airtight adapter of the present invention.

FIG. 7 shows still another example of the airtight adapter of the present invention. Also, the airtight adapter 40G is basically almost the same as the airtight adapter 40F shown in FIG. 5 but it is slightly different from the adapter 40F in the internal adapter body 30'. Cables 9*a*, 10*a* and 9*b*, 10*b* such as power supply lines or signal lines are passed through the cylinder of the internal adapter body 30' and the cylinder is filled with the filler 15*b* such as a resin.

Also in the internal adapter 301, the filler 15*b* and the cables are deteriorated as time passes. Moreover, it may be necessary to replace the body 30' because it is necessary to increase the number of cables and the number of cable cores due to change of testing equipments employed.

In this case, the internal adapter body 30' can be replaced by cutting the external cables 9*a* and 10*a* of the internal adapter body 30' short, performing predetermined operations almost similar to the case of the airtight adapter 40F in FIG. 5, bringing an end face of a spare internal adapter body 30' for replacement (not shown) arranged by winding the internal cables 9*b* and 10*b* into contact with the outside end face 30'A of the already-fitted internal adapter body 30' and slowly inserting the body 301 for replacement.

It is possible to use a tubular sealing member 32' used in the airtight adapter 40C as shown in FIG. 2 for the O-rings 32A and 32B of the airtight adapters 40F and 40G as shown in FIGS. 5 and 7.

As being apparent from the foregoing, the following advantages can be obtained from an airtight adapter and its replacing method of the present invention.

(1) When a part of an airtight adapter of an airtight unit requiring airtightness does not carry out an expected function due to scratch, damage, or contamination or it is necessary to replace the part because the number of cables or the number of cable cores must be increased, it is possible to relatively easily replace the part while keeping airtightness.

Therefore, particularly, in the case of an airtight unit such as a glove box, replacement can be performed without leaking an internal toxic substance (nuclear fuel substance, radiation, or chemically produced gas) to the outside.

(2) Because the replacement is performed in an airtight manner, it is unnecessary to additionally use any secondary equipment or system for maintaining an airtight environment. Therefore, it is possible to reduce the replacement cost.

(3) In the case of an airtight unit such as a glove box, an advantage can be obtained that replacement can be performed independently of such condition as an internal contamination level in accordance with the replacement under an airtight state.

(4) Because it is unnecessary to use a special jig for the replacement and it is possible to completely deal with the replacement only by rotating adapter components or holding components, the operability is improved and the efficient operations can be performed.

It can be said that the above preferable operability is very effective when considering that actual replacement is indirectly performed through an airtight glove into which the hand of an operator can be put, and that it is difficult to deal with a complicated manipulation or operation in a glove box.

(5) In the case of the replacement, because a replaced component such as an internal adapter body, a cylindrical joint, or an extended cylinder is taken into an airtight unit requiring airtightness such as a glove box, decontamination for replacement is unnecessary.

(6) In the case of the above replacement, a replaced component is limited only to an internal adapter body or the number of replaced components can be minimized to only such components as the internal adapter body, a cylindrical joint, and an extended cylinder. Therefore, particularly when handling a nuclear fuel substance or radiation substance in a unit such as a glove box, it is possible to greatly decrease the treatment frequency and the number of articles in custody because it is obligated to treat and keep not only the toxic substances but also the replaced components as contaminated substances.

(7) In the range of the inside diameter of an outer-cylinder adapter body of an airtight adapter, advantages are obtained that it is possible to easily change the specifications (change of light transmission specifications or change of capacity and performance specifications of a power supply cable or optical cable) of the penetrating portion or opening portion of an internal adapter body to be replaced and correspond to wide-range working conditions.

What is claimed is:

1. An airtight adapter for use with an airtight unit requiring airtightness, said airtight adapter comprising:

an outer-cylindrical adapter body adapted to be airtightly fixed to an airtight boundary of the airtight unit;

an internal adapter body inserted into and fitted in said outer-cylindrical adapter body in an airtight replaceable manner; and an annular sealing member positioned between an outer periphery of said internal adapter body and an inner periphery of said outer-cylindrical adapter body, wherein said annular sealing member is replaceable together with said internal adapter body.

2. An airtight adapter as claimed in claim 1, wherein said annular sealing member has a tubular form.

3. A method of replacing the internal adapter body of the airtight adapter as claimed in claim 2, the method comprising:

mounting a cylindrical joint to an outer end of the existing internal adapter body;

mounting an extended cylinder to an inner end of the outer-cylinder adapter body;

inserting one end of a spare internal adapter body, for the purpose of replacing the existing internal adapter body, into an open port of the cylindrical joint to thereby integrate the spare internal adapter body with the existing internal adapter body, wherein the spare internal adapter body is provided with an annular sealing member;

pushing and inserting the spare internal adapter body into a cylinder of the outer-cylinder adapter body while moving the existing internal adapter body into the extended cylinder;

securing the spare internal adapter body at a predetermined position in the cylinder of the outer-cylinder adapter body;

removing the extended cylinder in which the existing internal adapter body has been inserted; and removing the cylinder joint from the one end of the spare internal adapter body to thereby complete replacement of the existing internal adapter body in an airtight manner.

4. An airtight adapter as claimed in claim 1, wherein said annular sealing member comprises an O-ring.

5. An airtight adapter as claimed in claim 1, wherein said outer-cylinder adapter body includes a cylinder portion and a flange adapted to be secured to the airtight boundary of the airtight unit, said flange projecting radially outwardly from said cylinder portion.

6. An airtight adapter as claimed in claim 5, further comprising inner and outer fixing rings screwed into inner and outer ends of said cylinder portion, respectively, in order to hold said internal adapter body in said outer-cylinder adapter body.

7. An airtight adapter as claimed in claim 6, further comprising a key member for controlling the position of said internal adapter body relative to said outer-cylinder adapter body, wherein said key member is removably positioned adjacent an internal face of said outer fixing ring.

8. An airtight adapter as claimed in claim 1, wherein said cylindrical internal adapter body comprises a hollow cylindrical member, a light transmission body inserted in said hollow cylindrical member, and at least one annular sealing member disposed between an outer peripheral surface of said light transmission body and an inner peripheral surface of said hollow cylindrical member.

9. An airtight adapter as claimed in claim 1, wherein said cylindrical internal adapter body comprises a hollow cylindrical member filled with a resin material, and at least one cable passing through said resin material.

10. A method of replacing the internal adapter body of the airtight adapter as claimed in claim 1, the method comprising:

mounting a cylindrical joint to an outer end of the existing internal adapter body;

mounting an extended cylinder to an inner end of the outer-cylinder adapter body;

inserting one end of a spare internal adapter body into an open port of the cylindrical joint to thereby integrate the spare internal adapter body with the existing internal adapter body, wherein the spare internal adapter body is provided with an annular sealing member;

pushing and inserting the spare internal adapter body into a cylinder of the outer-cylinder adapter body while moving the existing internal adapter body into the extended cylinder;

fitting the spare internal adapter body at a predetermined position in the cylinder of the outer-cylinder adapter body;

removing the extended cylinder in which the existing internal adapter body has been inserted; and removing the cylinder joint from the one end of the spare internal adapter body to thereby complete replacement of the existing internal adapter body in an airtight manner.

11. An airtight adapter for use with an airtight unit requiring airtightness, said airtight adapter comprising:

an outer-cylinder adapter body capable of being fixed airtightly to an airtight boundary of the airtight unit;

an internal adapter body inserted into and fitted in said outer-cylinder adapter in an airtight replaceable manner; and at least two annular sealing members positioned between an outer periphery of said internal adapter body and an inner periphery of said outer-cylinder adapter body, said annular sealing members being replaceable together with said internal adapter body.

12. An airtight adapter according to claim 11, wherein:

said internal adapter body extends from an outer end of said outer-cylinder adapter body to beyond an inner end of said outer-cylinder adapter body;

said at least two annular sealing members comprise an inside sealing member and an outside sealing member; and a relation of a>b+c is achieved, where "a" is the length of the outer-cylinder adapter body, "b" is a clearance from the outside sealing member up to the outside end of the internal adapter body, and "c" is a clearance from the inside sealing member to the inside end of the internal adapter body.

13. A method of replacing the internal adapter body of the airtight adapter as claimed in claim 12, the method comprising:

bringing an end face of a spare internal adapter body into contact with an outer end of the existing internal adapter body, wherein the spare internal adapter body is provided with annular sealing members;

pushing and inserting the spare internal adapter body into a cylinder of the outer-cylinder adapter body while moving the existing internal adapter body through the cylinder of the outer cylinder adapter body;

securing the spare internal adapter body at a predetermined position in the cylinder of the outer-cylinder adapter body; and moving the existing internal adapter body out of the inner end of the outer-cylinder adapter body to thereby complete replacement of the existing internal adapter body in an airtight manner.

14. A method of replacing the internal adapter of the airtight adapter as claimed in claim 12, the method comprising:

mounting a cylindrical joint to an outer end of the existing internal adapter body;

mounting an extended cylinder to an inner end of the outer-cylinder adapter body;

inserting one end of a spare internal adapter body, for the purpose of replacing the existing internal adapter body, into an open port of the cylindrical joint to thereby integrate the spare internal adapter body with the existing internal adapter body, wherein the spare internal adapter body is provided with annular sealing members;

pushing and inserting the spare internal adapter body into a cylinder of the outer-cylinder adapter body while moving the existing internal adapter body into the extended cylinder;

securing the spare internal adapter body at a predetermined position in the cylinder of the outer-cylinder adapter body;

removing the extended cylinder in which the existing internal adapter body has been inserted; and removing the cylinder joint from the one end of the spare internal adapter body to thereby complete replacement of the already-fitted internal adapter body in an airtight manner.

15. A method of replacing the internal adapter body of the airtight adapter as claimed in claim 11, the method comprising:

mounting a cylindrical joint to an outer end of the existing internal adapter body;

mounting an extended cylinder to an inner end of the outer-cylinder adapter body;

inserting one end of a spare internal adapter body, for the purpose of replacing the existing internal adapter body, into an open port of the cylindrical joint to thereby integrate the spare internal adapter body with the existing internal adapter body, wherein the spare internal adapter body is provided with annular sealing members;

pushing and inserting the spare internal adapter body a cylinder of the outer-cylinder adapter body while moving the existing internal adapter body into the extended cylinder;

securing the spare internal adapter body at a predetermined position in the cylinder of the outer-cylinder adapter body;

removing the extended cylinder in which the existing internal adapter body has been inserted; and removing the cylinder joint from the one end of the spare internal adapter body to thereby complete replacement of the existing internal adapter body in an airtight manner.

* * * * *